United States Patent
Froment et al.

(10) Patent No.: US 9,357,054 B1
(45) Date of Patent: May 31, 2016

(54) DETERMINING USER'S SEATING POSITION IN VEHICLE USING BAROMETER AND MOTION SENSORS

(71) Applicant: Amazon Technologies, Inc., Seattle, WA (US)

(72) Inventors: Arnaud Marie Froment, San Jose, CA (US); Gy Stuart Fullmer, Santa Cruz, CA (US); Wendy Chiu Fai Wong, San Jose, CA (US); Sean Thomas Congden, Mountain View, CA (US); Seetha Lakshmi Annamraju, Mountain View, CA (US); Kenneth Paul Kiraly, Menlo Park, CA (US); Brett Nathan Lynnes, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/644,595

(22) Filed: Mar. 11, 2015

(51) Int. Cl.
H04M 3/00 (2006.01)
H04M 1/725 (2006.01)
H04W 4/02 (2009.01)

(52) U.S. Cl.
CPC ...... *H04M 1/72577* (2013.01); *H04M 1/72569* (2013.01); *H04M 1/72572* (2013.01); *H04W 4/02* (2013.01)

(58) Field of Classification Search
CPC .............. H04M 1/72577; H04M 1/72569; H04M 1/72572; H04W 4/02
See application file for complete search history.

(56) References Cited

U.S. PATENT DOCUMENTS

| | | | | |
|---|---|---|---|---|
| 8,386,119 B2* | 2/2013 | Kobayashi | ......... | B60G 17/0195 180/167 |
| 8,406,959 B2* | 3/2013 | Foo | ...................... | B60R 21/0136 280/735 |
| 9,037,125 B1* | 5/2015 | Kadous | ............. | H04M 1/72577 455/418 |
| 2006/0244581 A1* | 11/2006 | Breed | ................. | B60C 23/0433 340/447 |
| 2007/0085697 A1* | 4/2007 | Breed | ...................... | H04Q 9/00 340/4.62 |
| 2011/0210830 A1* | 9/2011 | Talty | .................... | H04B 5/0031 340/10.51 |
| 2012/0214472 A1* | 8/2012 | Tadayon | .............. | H04B 5/0062 455/418 |

OTHER PUBLICATIONS

Wang, et al. Sensing Vehicle Dynamics for Determining Driver Phone Use. Proceeding of the 11th annual International Conference on Mobile systems, Applications, and Services, pp. 41-54. ACM, 2013.
Madgwick, et al. An efficient orientation filter for inertial and inertial/magnetic sensor arrays, pp. 1-32, Apr. 30, 2010.

* cited by examiner

*Primary Examiner* — Keith Fang
(74) *Attorney, Agent, or Firm* — Seyfarth Shaw LLP; Ilan N. Barzilay; David A. Klein

(57) ABSTRACT

A handheld electronic device determines its position in a moving vehicle based on changes in air pressure that occur when the vehicle undergoes acceleration. Based on a direction of acceleration that correlates to a subsequent reduction in air pressure, a determination is made as to whether the device is in the front left, front right, back left, or back right quadrant of the vehicle. The device then alters its configuration based on the quadrant in which it is located.

20 Claims, 14 Drawing Sheets

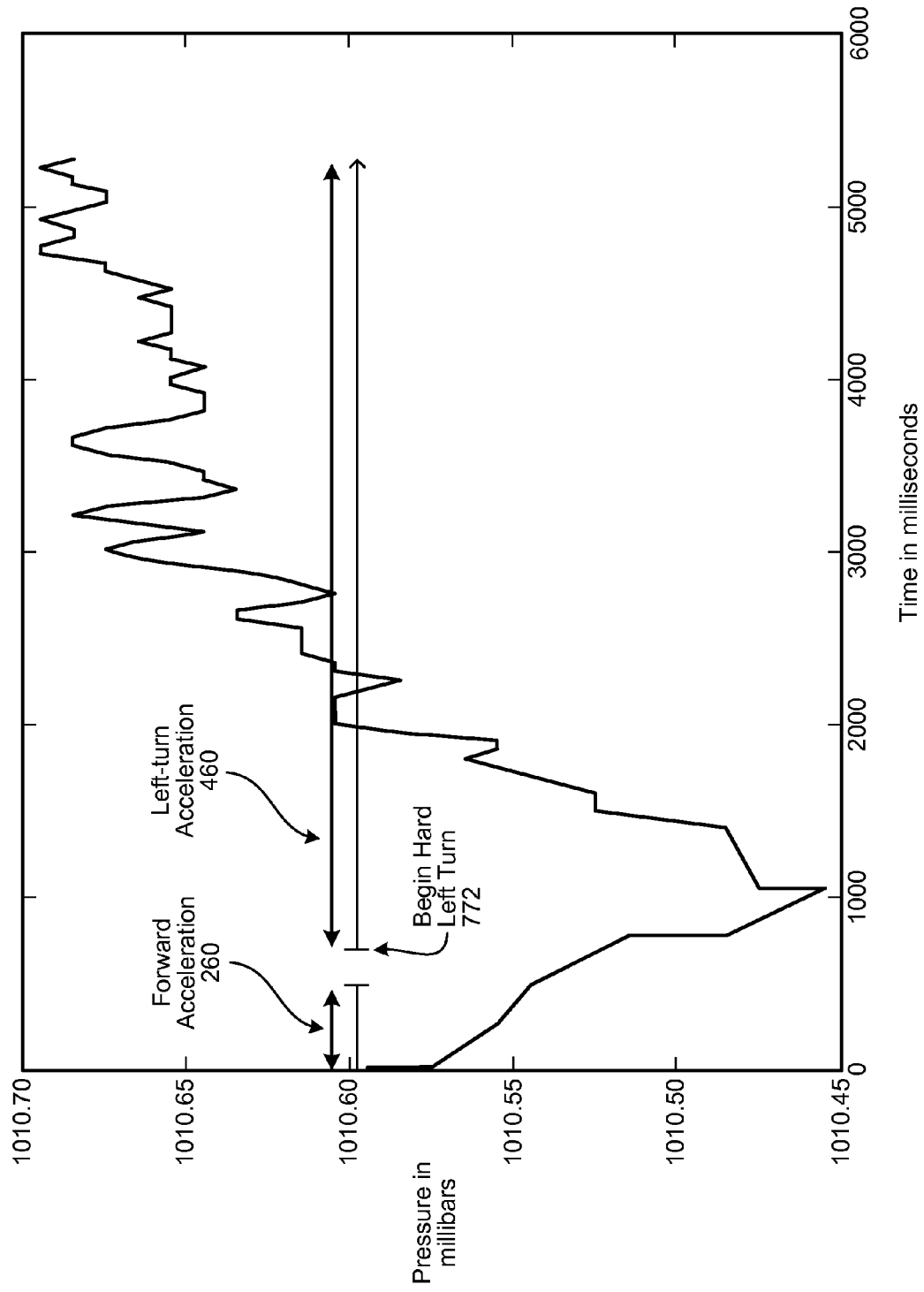

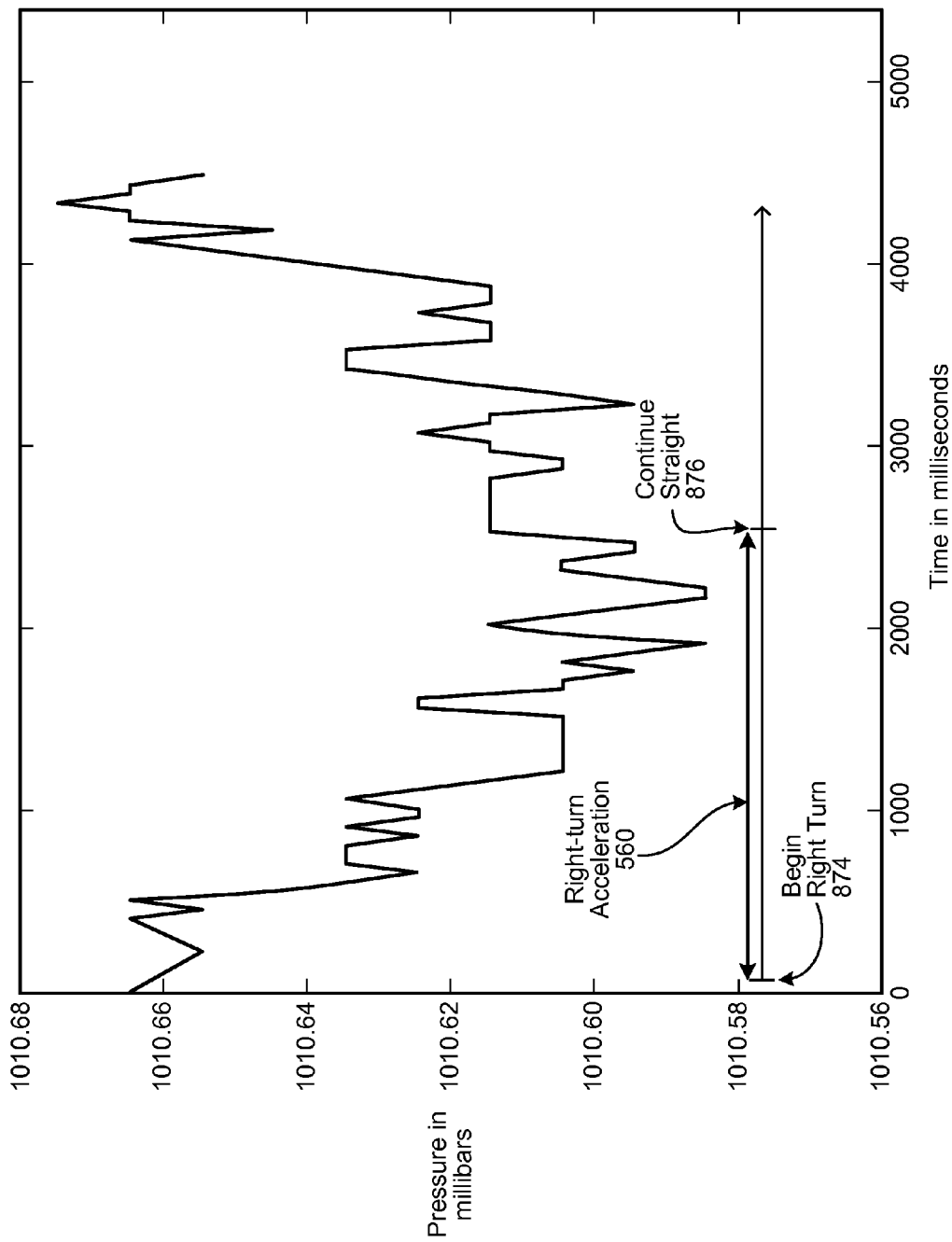

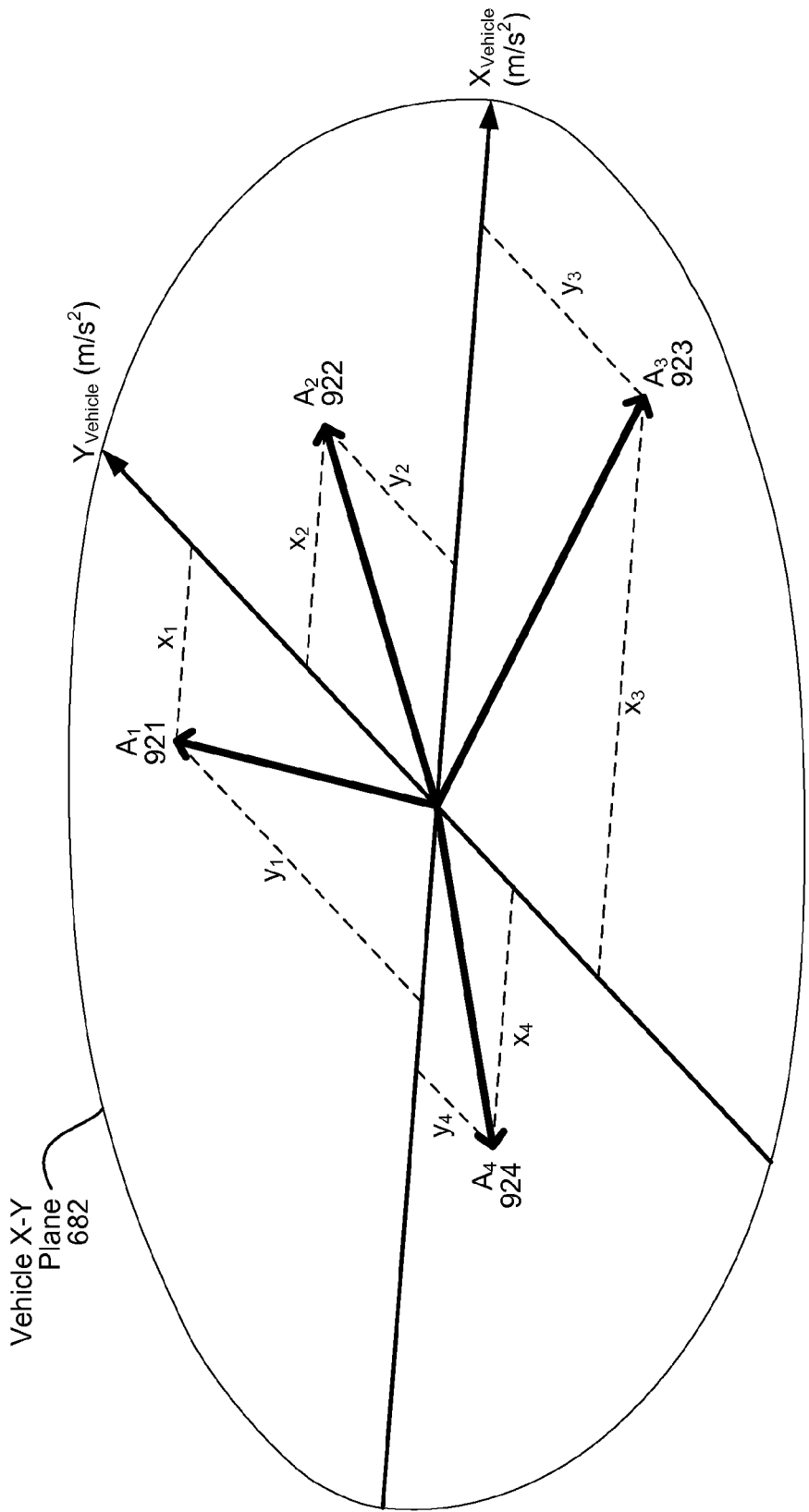

DETERMINING USER'S SEATING POSITION IN VEHICLE USING BAROMETER AND MOTION SENSORS

BACKGROUND

Handheld electronic devices such as cellular telephone and tablet computers are often used within moving vehicles. Depending upon whether the user of the device is a driver or passenger, using the device for some services such as reading or writing text messages may be dangerous and/or illegal. Some existing devices such as geolocation receivers will disable text entry (e.g., entry of destinations) while a vehicle is in motion, even though a passenger may be the person attempting entry. Adding such a generalized prohibition on text entry to personal handheld electronic devices would undermine their usefulness, making such a solution impractical.

BRIEF DESCRIPTION OF DRAWINGS

For a more complete understanding of the present disclosure, reference is now made to the following description taken in conjunction with the accompanying drawings.

FIGS. 7 and 8 illustrate examples of measured changes in pressure inside a vehicle.

FIGS. 9A to 9C illustrate a graphical representation of acceleration and pressure data.

DETAILED DESCRIPTION

If a moving vehicle that has an enclosed atmosphere accelerates or decelerates, the volume of air within the vehicle shifts away from the acceleration in accordance with Newton's first law of motion. This can be demonstrated by placing a helium balloon inside a vehicle: the balloon will appear to "rise" towards the direction of acceleration because the air has become less dense there. Based on this shift in the air, a person's position can be determined using sensors on personal electronic devices such as smart-phones.

Among the sensors increasingly common on consumer electronic devices are sensitive barometers that are able to record this local shift in atmospheric pressure. If the local shift in atmospheric pressure data is coupled with accelerometer data, a determination can be made as to which acceleration event causes which pressure shift event.

Figure 1:
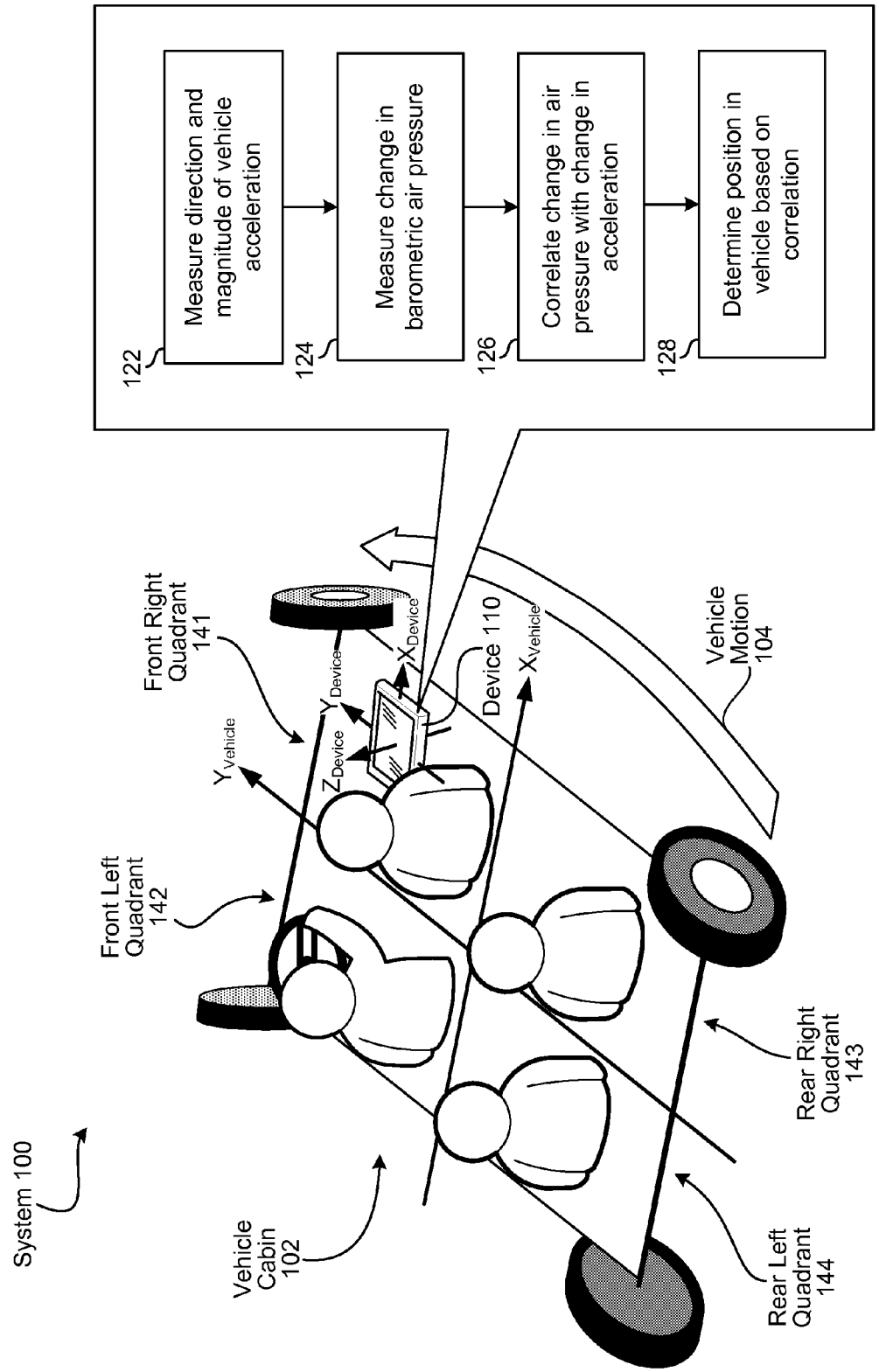
FIG. 1 illustrates a system for determining a user's seating position in a vehicle using a barometer and motion sensors on a handheld electronic device.

FIG. 1 illustrates a system 100 for determining the location of an electronic device 110 within a vehicle cabin 102 using barometer and motion sensor data. If the "center point" of a vehicle is the intersection of the lateral axis ($X_{Vehicle}$) and longitudinal cross axis ($Y_{Vehicle}$) of the vehicle's cabin, a device 110 within the vehicle's cabin 102 situated in the direction of the acceleration relative to the center point will experience a drop in air pressure, while a device 110 situated away from the direction of acceleration relative to the center point will experience an increase in air pressure. Based on these measurements, a determination may be made as to whether the device 110 is situated in the front right quadrant 141, front left quadrant 142, rear right quadrant 143, or rear left quadrant 144 of the vehicle cabin 102.

Using an automobile with closed windows as an example, if a device 110 initially detects a decrease in pressure slightly after detecting vehicle acceleration, the device can be determined to be in the front of the vehicle. If, during a right hand turn, the device initially detects an increase in pressure, the device can be determined to be on the left half of the vehicle. After the initial increase or decrease in local pressure due to inertia, air within the vehicle cabin 102 may "slosh." While the sloshing effect in air may be subtler than what occurs with liquids, the changes in air pressure within the vehicle can be characterized by similar "inertial" waves that are detectable by the barometer of a consumer electronic device. As a result of this sloshing, the initial increase or decrease in local pressure is transitory and may exhibit some periodicity before returning to equilibrium, even during a prolonged acceleration.

The initial change in pressure occurs after the initiation of acceleration. By monitoring motion acceleration and pressure over time, changes in one can be correlated to the other. The amount of time after acceleration begins before the pressure begins to change is directly proportional to the magnitude and duration of the acceleration.

The device 110 continually measures (122) the direction and magnitude of vehicle acceleration, and measure changes (124) in barometric air pressure. Changes in air pressure that begin after the initiation of acceleration are correlated (126) with the change in acceleration. The position of the device within the vehicle is determined (128) based on this correlation.

When a device barometer records a sudden increase in pressure while a vehicle is in motion, the increase is usually due two one of two things: either the vehicle has changed elevation suddenly, or the air inside the vehicle is sloshing about as it does during acceleration. By correlating acceleration data to pressure change data, a determination is made as to how the air pressure inside the vehicle is reacting to the acceleration. Based on fluid dynamic theory, a the pressure inside the vehicle will initially decrease on the side nearest the acceleration direction, and initially increase away from the acceleration (as the air "sloshes" back away from the acceleration).

Because a vehicle is usually not perfectly sealed, and because advanced fluid dynamics would show that the effect of the exact shape of the inside of the vehicle makes it improbable that an there will be an exact match of acceleration to a pressure reading at any time. However it is been demonstrated that major acceleration events (turns, i.e.) correlate well to major air pressure changes. Those major events can then be used to determine the location of the device (if not all the "noise" between events).

FIGS. 2 to 5 illustrate examples of the relationship between vehicle acceleration and the initial direction of cabin airflow resulting from the acceleration. An automobile is used as the example vehicle, but the principles apply to most any vehicle with an enclosed atmosphere. It may take several turns/acceleration/decelerations to exactly pinpoint a quadrant for the device's location since each acceleration event will only bisect the problem once. An ideal situation is a user making a sharp left turn from a stop and a sharp right turn from a stop since the acceleration for both of these events would point forward left and forward right respectively, providing near perpendicular vectors.

Figure 2:
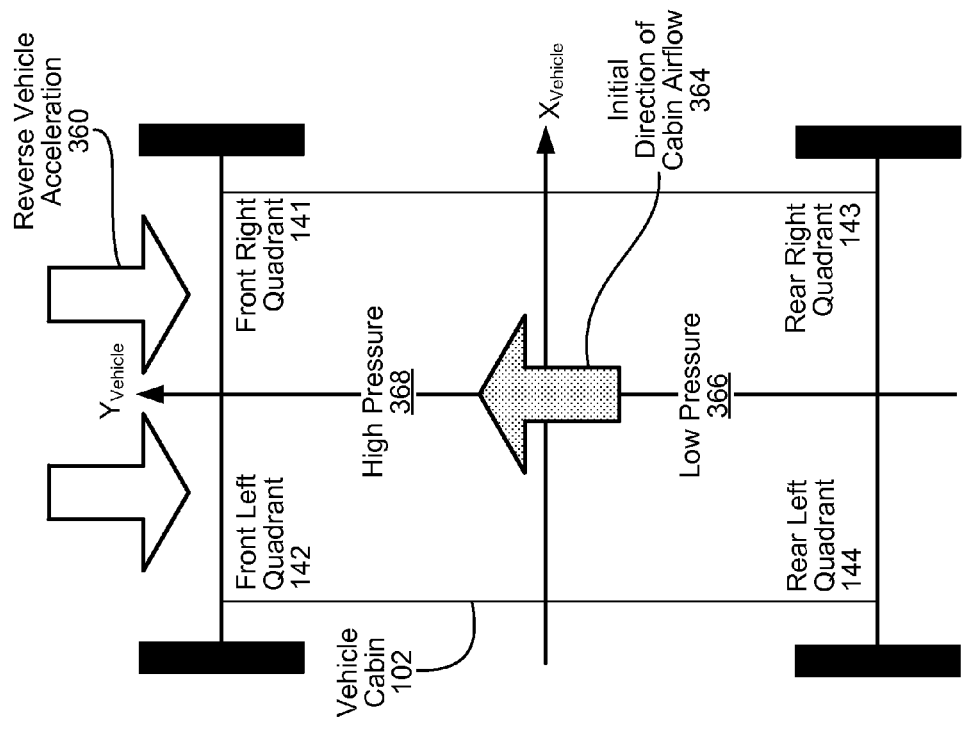
FIGS. 2-5 demonstrate relationships between vehicle acceleration and the direction of cabin airflow.

In FIG. 2, the vehicle undergoes forward acceleration 260. Inertia causes the initial direction of cabin airflow 264 to be opposite the direction of forward acceleration, resulting in a lowering of air pressure 266 towards the front of the vehicle cabin 102 and a raising of air pressure 268 towards a rear of the vehicle cabin 102.

Figure 3:
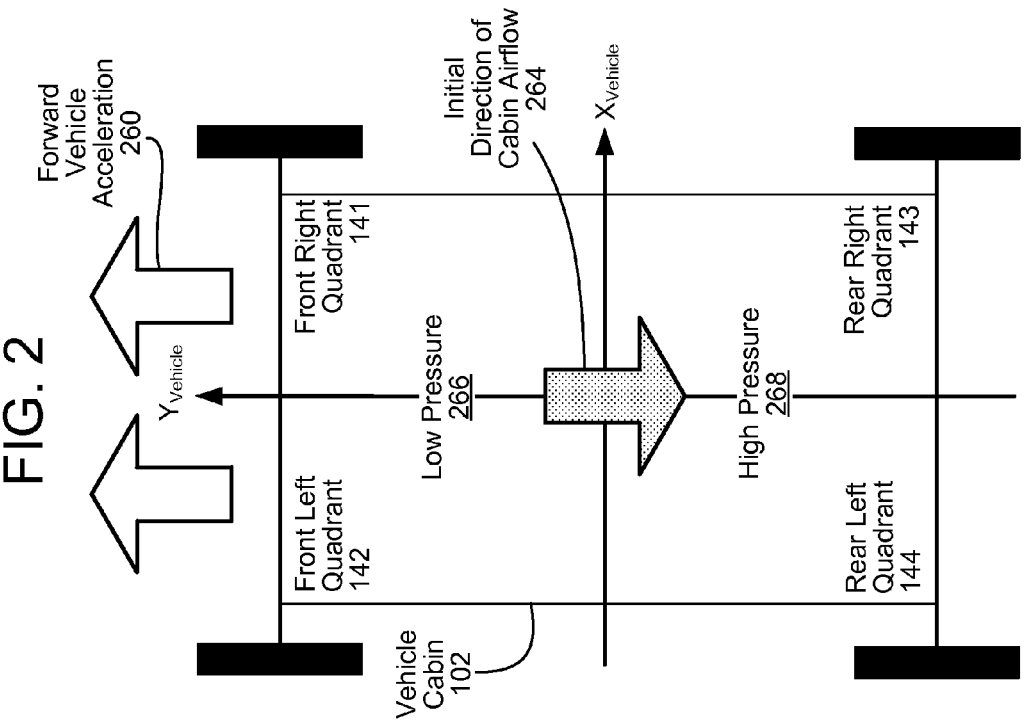

In FIG. 3, the vehicle undergoes reverse acceleration 360 as may occur, for example, when a vehicle brakes or travelling in reverse. Inertia causes the initial direction of cabin airflow 364 to be opposite the direction of reverse acceleration, resulting in an increase in air pressure 368 towards the front of the vehicle cabin 102 and a reduction of air pressure 366 towards a rear of the vehicle cabin 102.

Figure 4:
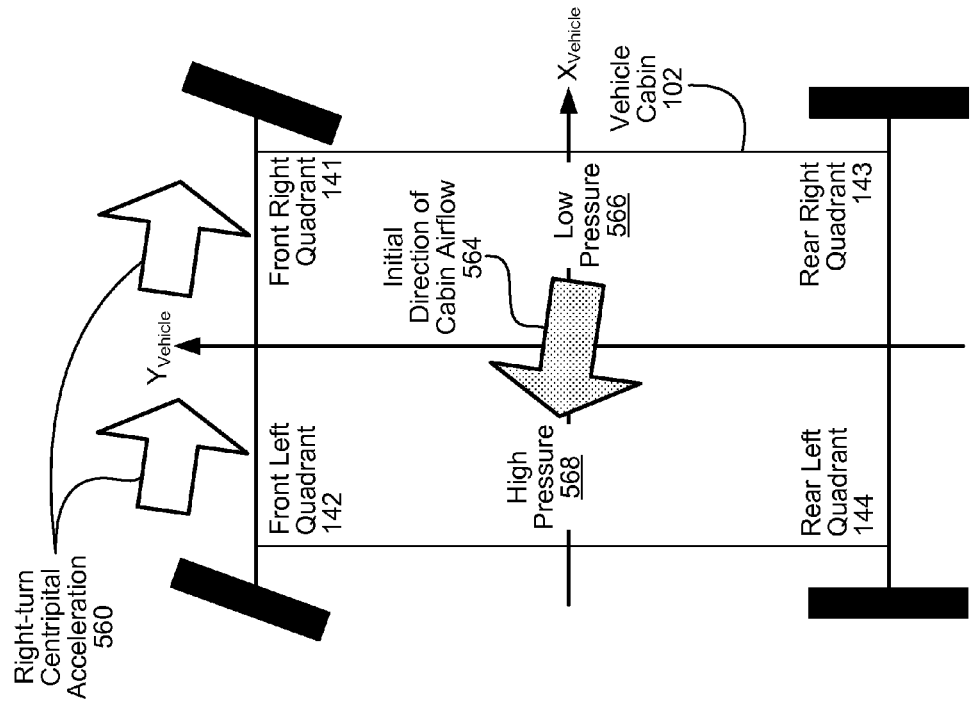

In FIG. 4, the vehicle undergoes centripetal acceleration due to a left turn 460. Centrifugal inertia causes the initial direction of cabin airflow 466 to be opposite the direction of acceleration due the left turn, resulting in an increase in air pressure 468 on the right side of the vehicle and a reduction of air pressure 466 on a left side of the vehicle.

Figure 5:
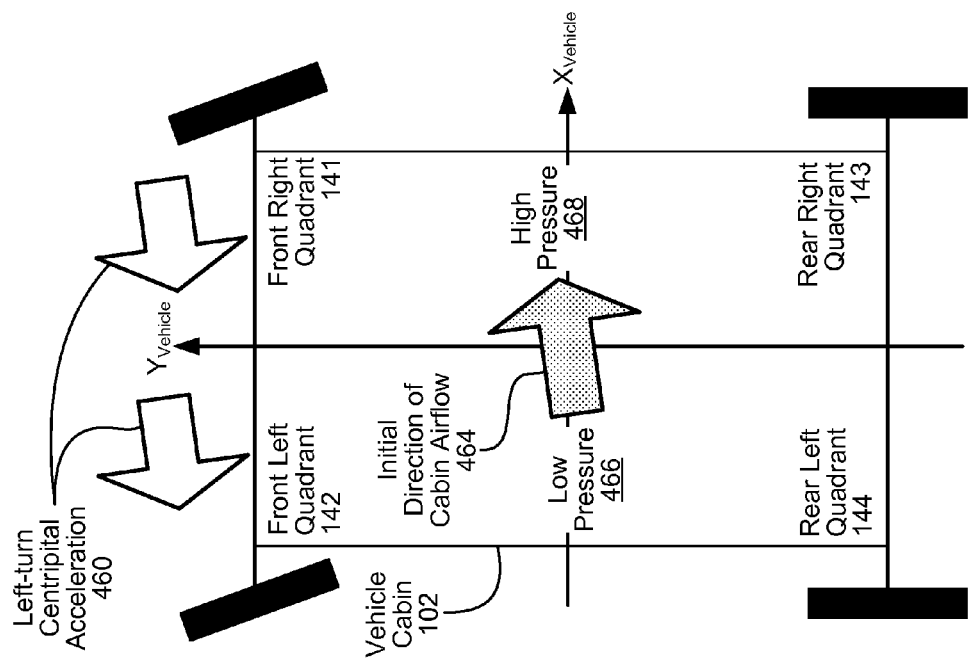

In FIG. 5, the vehicle undergoes centripetal acceleration due to a right turn 560. Centrifugal inertia causes the initial direction of cabin airflow 566 to be opposite the direction of acceleration due to the right turn, resulting in an increase in air pressure 568 on the left side of the vehicle and a reduction of air pressure 566 on a right side of the vehicle.

Determining whether a person in a front seat is a driver or a passenger depends upon where the driving position is located (e.g., front-right in the United Kingdom, front-left in North America). In North America, a person in the front left quadrant 142 of an automobile is likely the driver, thus allowing the device 110 to determine that if it is being used in the front left quadrant 142 within the United States, it is likely being used by the driver of the vehicle.

A device 110 may determine what country it is in using regional or geolocation services. An example of a regional service that is widely supported is the Traffic Message Channel (TMC) that broadcasts digitally coded traffic information. Examples of geolocation services are the Global Positioning System (GPS) and the Globalnaya Navigatsionnaya Sputnikovaya Sistema (GLONASS). By correlating location information with stored data indicating the standard side of the vehicle for a steering wheel, a default driver position can be determined for a location.

Figure 6:
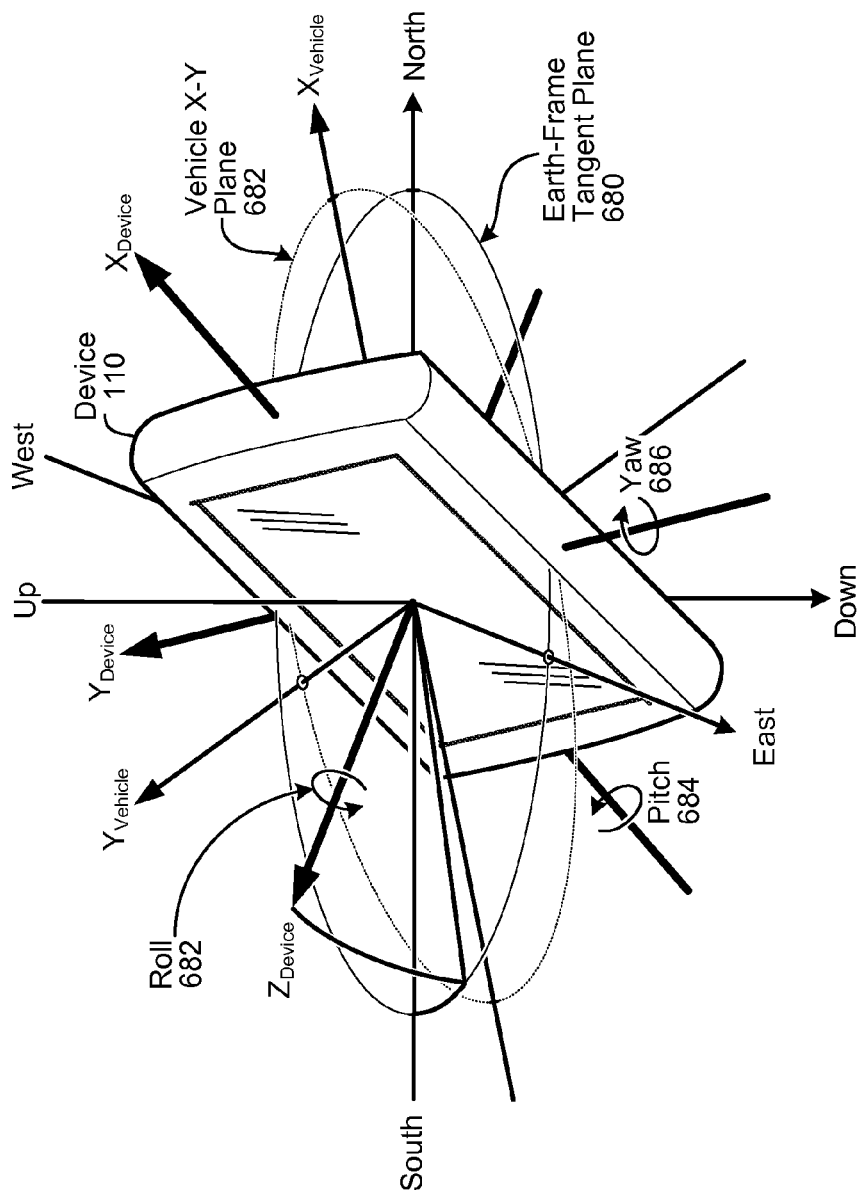
FIG. 6 illustrates reference frames in the system.

FIG. 6 illustrates reference frames in the system 100. Modern computing devices may be configured with user interfaces and/or software applications controlled-in-part by changes in device orientation and inertial motion. Such devices may track changes in the device's motion so that the user interface (UI) and/or software application that depends on the motion operates properly. Such devices may include an IMU (Inertial Measurement Unit) to detect changes in motion.

An IMU typically includes a three-axis gyroscope to measure rotational movement, a three-axis accelerometer to measure acceleration, and a three-axis magnetometer to provide compass direction. With the exception of the direction of gravity which acts as a downward acceleration on the device and can be measured by the accelerometer, an IMU by itself only has the magnetometer data to determine how the device's reference frame (e.g., device sensor frame axes $X_{Device}$, $Y_{Device}$, and $Z_{Device}$) relates to an "absolute" reference frame such as an Earth coordinate-based reference frame.

North East Down (NED), also known as local tangent plane (LTP), is a geographical coordinate system in an Earth reference frame that is commonly used in aviation, and may be used with IMUs. If the direction of an Earth field such as gravity and/or magnetic North is known in the Earth reference frame, a measurement of that same field within the device's sensor frame (e.g., relative to $X_{Device}$, $Y_{Device}$, and $Z_{Device}$) allows a device to determine the orientation of its sensor frame relative to the Earth reference frame, and likewise, the orientation of the Earth reference frame relative to its sensor frame.

Based on a direction of device motion over time, a device may also extrapolate its own orientation relative to the reference frame of a vehicle in which it travels (e.g., vehicle reference frame axes $X_{Vehicle}$, $Y_{Vehicle}$). Such extrapolation is commonly performed by portable navigation devices such as handheld and mountable Global Positioning System (GPS) devices, where device motion over time is used to extrapolate vehicle orientation based upon, for example, an average direction of device motion.

Such devices may include an "orientation filter." An orientation filter handles the task of integrating motion data from the device's accelerometers, gyroscopes, magnetometers, etc., to provide a single estimate of device orientation. This integration task is sometimes referred to as "sensor fusion." In an orientation filter, if there is a difference between the device's "predicted" inertial reference frame and the "observed" external reference frame (e.g., North, East, down) due to drift, error, etc., the orientation filter adjusts the predicted frame to correct the error (e.g., using a Kalman filter).

Referring to FIG. 6, an orientation filter of the device 110 may fuse data over time from the device's motion sensors with geolocation information (e.g., from a Global Positioning System (GPS) receiver) to determine an orientation of the device 110 relative to an Earth coordinate-based reference frame ("Earth reference frame").

The orientation filter may determine the orientation of the device relative to the Earth reference frames (and vice-versa) based on changes detected by the IMU, such as changes detected in acceleration based on accelerometer data, changes detected in roll 182, pitch 184, and yaw 186 based on gyroscope data, and magnetometer data. The device reference frame is illustrated by the $X_{Device}$, $Y_{Device}$, and $Z_{Device}$ axes. The Earth reference frame is illustrated by North, East, and down axes. The North and East axes form the Earth-frame tangent plane 680, and the down axis is perpendicular to the tangent plane 680. The Earth-frame tangent plane 680 is approximately parallel to flat, level ground.

Since the orientation of the device 110 within the vehicle is not fixed relative to the vehicle's reference frame, the orientation of the device 110 relative to the vehicle may be determined based on an assumption that motion of the device 110 inside the vehicle will predominately be forward along the vehicle's longitudinal $Y_{Vehicle}$ axis. Thus, motion sensor data may be used to extrapolate vehicle motion independent of the orientation of the device 110 within the vehicle cabin 102. The vehicle reference frame is illustrated by the $X_{Vehicle}$ and $Y_{Vehicle}$ axes. The vehicle's lateral $X_{Vehicle}$ axis and longitudinal $Y_{Vehicle}$ axis form the vehicle X-Y plane 682. Stationary on flat ground, the vehicle X-Y axis 682 will ordinarily be parallel to the earth-frame tangent plane 680. However, when the vehicle is on an incline, the vehicle X-Y plane 682 and Earth-frame tangent plane 680 will be different.

In addition to using accelerometer and barometer data to determine the device user's seating position based on changes in air pressure inside a closed space, data from the other device motion sensors may also be used, such as a magnetometer (compass) and/or a gyroscope, to provide a more detailed model of forces experienced by the vehicle.

FIGS. 7 and 8 illustrate examples of barometric pressure readings made while performing left and right hand turns, recorded from the passenger seat of an automobile. When making the turns illustrated data effort was made to turn without altering the forward velocity of the vehicle, since changes in "forward" acceleration skew the pressure downward as the air rushes to the back of the vehicle.

FIG. 7 illustrates a right hand turn. During forward acceleration 260, the air pressure initially falls, indicating that the device 110 is in the front half of the vehicle. After a hard left turn 772 begins left-turn acceleration 460, the air pressure initially climbs, indicating that the device is located to the right side of the vehicle. Combining these two acceleration-pressure events, a determination can be made that the device 110 is in the front right quadrant 241.

FIG. 8 illustrates a right turn. After a right hand turn 874 begins right-turn acceleration 560, air pressure falls, indicating that the device is on the right side of the vehicle. After the vehicle continues on straight 876, the continued sloshing of the air pressure can be seen as air pressure rises and falls after the acceleration event has ended.

Figure 9B:
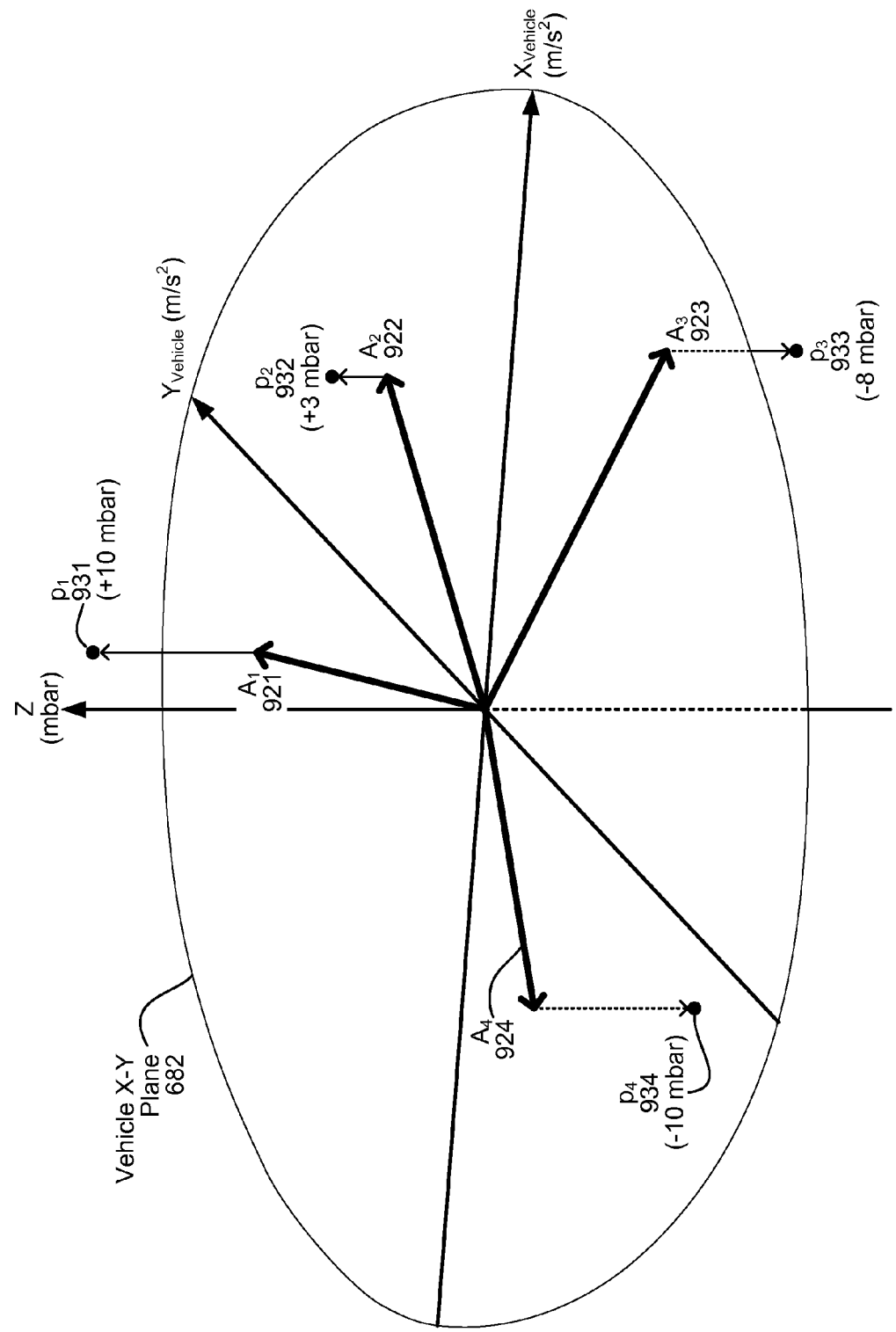
Figure 9C:
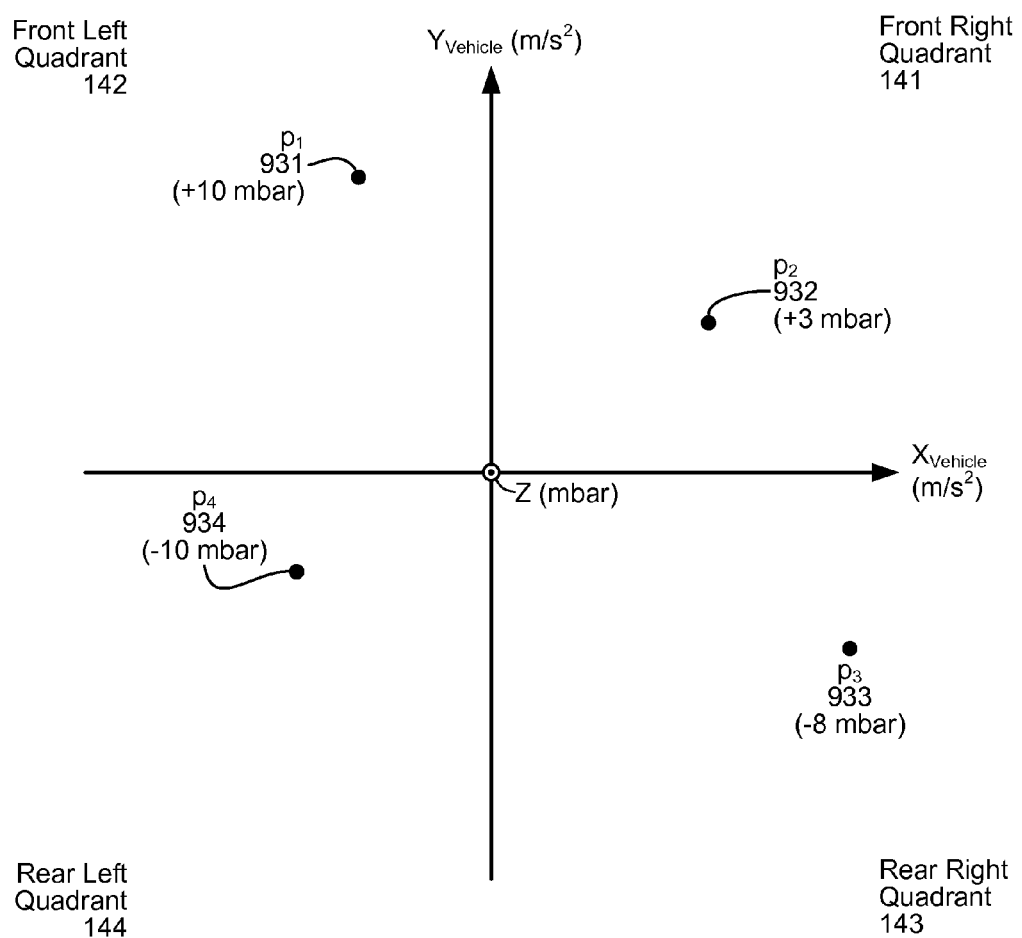

FIGS. 9A to 9C illustrate a graphical representation of acceleration and pressure data to demonstrate how the correlation between motion and pressure data may be used to determine device position.

FIG. 9A illustrates four acceleration vectors in the vehicle X-Y plane 682, translated by the device 110 from the device sensor frame to the vehicle reference frame. Each vector conveys a direction in the vehicle reference frame and a magnitude (e.g., a magnitude in meters-per-second). A first acceleration vector $A_1$ 921 as a negative lateral value $X_1$ and a positive longitudinal value $Y_1$. A second acceleration vector $A_2$ 922 as a positive lateral value $X_2$ and a positive longitudinal value $Y_2$. A third acceleration vector $A_3$ 923 as a positive lateral value $X_3$ and a negative longitudinal value $Y_3$. A fourth acceleration vector $A_4$ 924 as a negative lateral value $X_4$ and a negative longitudinal value $Y_4$.

In FIG. 9B, a scalar pressure change in millibar correlated with the respective acceleration is plotted in the "Z" direction. A pressure $p_1$ 931 of +10 mbar correlates with the acceleration vector $A_1$ 921. A pressure $p_2$ 932 of +3 mbar correlates with the acceleration vector $A_2$ 922. A pressure $p_3$ 933 of −8 mbar correlates with the acceleration vector $A_3$ 923. A pressure $p_4$ 934 of −10 mbar correlates with the acceleration vector $A_4$ 924.

In FIG. 9C, looking straight down the Z axis at the vehicle X-Y plane 682, a the result is a distribution of pressures. As illustrated, pressure $p_1$ 931 is in the front left quadrant 142, pressure $p_2$ is in the front right quadrant 141, pressure $p_3$ 933 is in the rear right quadrant 933, and pressure $p_4$ 934 is in the rear left quadrant 934.

Figure 10:
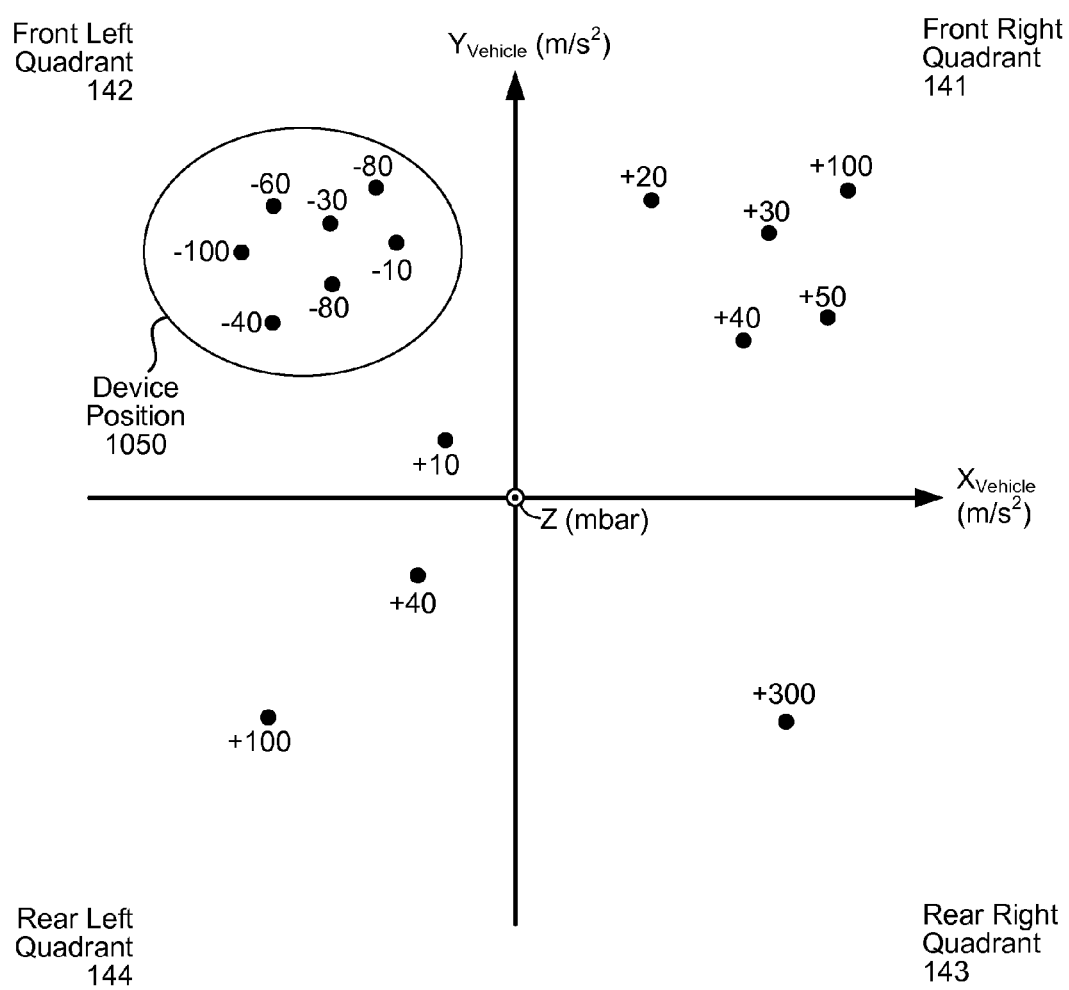
FIGS. 10 and 11 illustrate example determinations of seat position in a vehicle cabin based on acceleration and pressure data.
Figure 11:
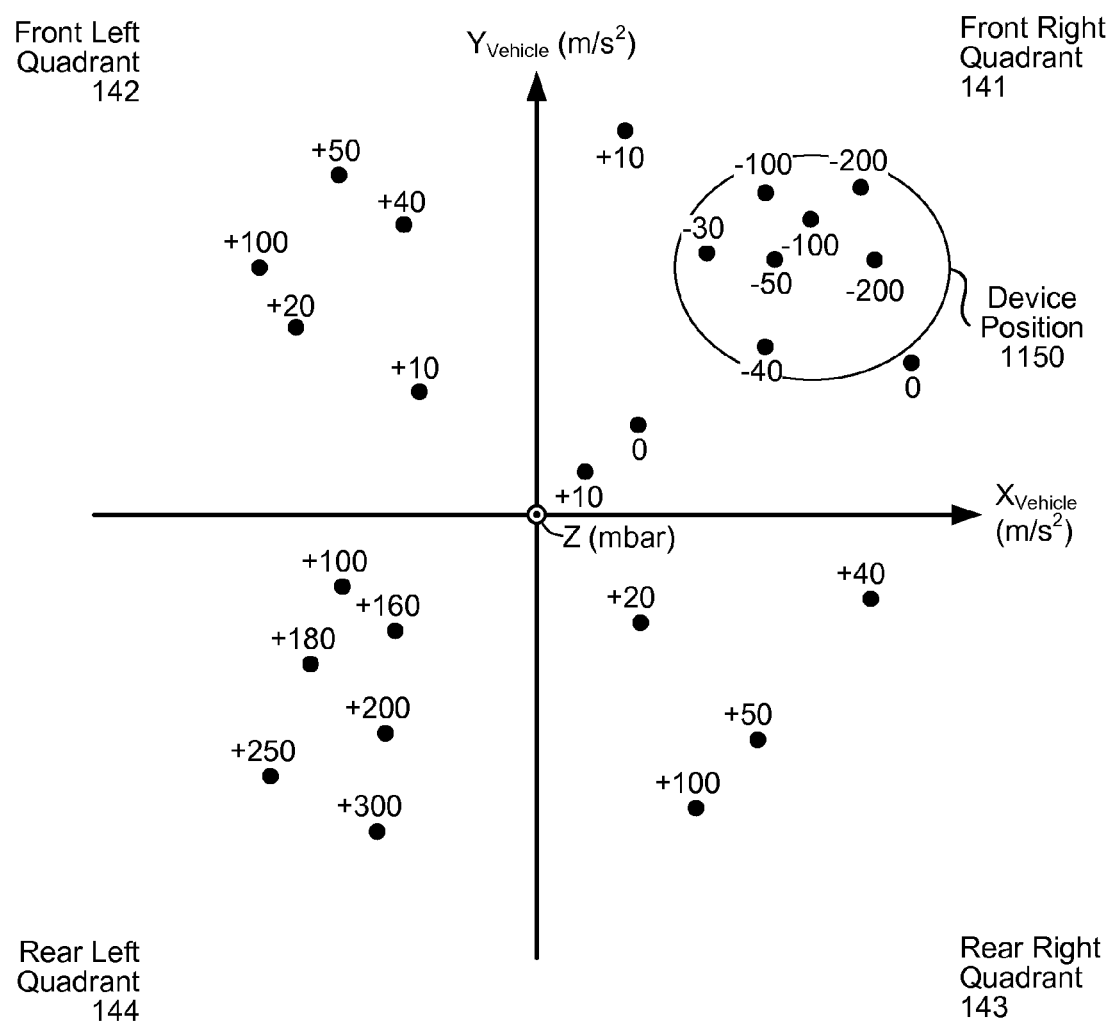

FIGS. 10 and 11 illustrate example determinations of seat position in a vehicle cabin based on acceleration and pressure data, using the framework presented in FIGS. 9A to 9C.

As illustrated in FIG. 10, a cluster of negative pressures are measured over time that correlate with accelerations in the front left quadrant 142. Based on this cluster of negative pressure, a determination is made of device position 1050.

As illustrated in FIG. 11, a cluster of negative pressures are measured over time that correlate with accelerations in the front right quadrant 141. Based on this cluster of negative pressure, a determination is made of device position 1150.

If the pressures in FIGS. 10 and 11 were plotted to include a topological surface in three dimensions formed by each of the pressure measurements, the cluster of low points causing a down slope in the surface indicates the direction of the quadrant of the device within the vehicle. The device position determination may be made by modeling the data as a Gaussian surface, by averaging the pressure values in each quadrant, etc. Various algorithms may be used to make the quadrant determination, such as a decision tree (e.g., testing the data in each quadrant using if-then statements to determine if one is lower based on a Gaussian model, averaging, etc., than the others by a threshold amount, or that no quadrant is lower than the other by the threshold amount and that more data is needed), a purely mathematical decision (e.g., the direction of the acceleration vector corresponding to the lowest pressure, or cluster-based analysis (as illustrated in FIGS. 10 and 11). Examples of algorithms that may be used to identify clusters include hierarchical clustering using distance-based connectivity models, an iterative expectation-maximation algorithm, and graph-based cluster modeling. Expectation maximation is the preferred approach.

The thresholds applied to the motion/pressure data points for clustering analysis may be determined dynamically to recalibrate for changes in ambient pressure, such as recalibrating to a baseline pressure when the device is not moving (or other reference pressure) and adjusting thresholds accordingly. For example, a threshold value may be determined when the IMU, orientation filter, and/or a vehicle telematics system indicate zero motion, and the barometer data is relatively stable. "Relatively stable" in the context of barometer data means stable but—for pressure oscillations that a barometer may ordinarily exhibit. Such oscillations may be characterized as noise, and are illustrated by the short, sharp higher-frequency oscillations in the pressure curves illustrated in FIGS. 7 and 8.

The system is most accurate when it is possible to bisect a vehicle based on acceleration direction. Devices in the middle front or middle rear seat in vehicles with such seating arrangements or in a middle row if seating may not be able to detect changes accurately enough to indicate their position based on the initial change in air pressure after the initiation of acceleration. Left/right accelerations in automobiles usually have a front/back component as well that would need to be calculated per acceleration vector. However, by modelling the rise-and-fall of pressure over time due to sloshing, additional position such as middle seat and middle row positions may be determined.

Calculation of pressure may add and subtract values from the barometer-based data to adjust for changes in elevation. For instance an automobile going down a looping on-ramp to a controlled-access highway may gain a millibar of pressure due to height change which can potentially skew the readings. The downward distance traveled can be interpolated using acceleration data over time, and/or may be determined using geolocation information (e.g., an altitude component of a GPS position).

The barometer is preferably sufficiently sensitive to register a change in the hundredths of millibars, with a pressure change of approximately one-tenth of a millibar corresponding to an acceleration shifts around 1 G (i.e., around 9.8 m/s$^2$) in a typical automobile cabin. More granular barometric data improves accuracy, and enables position to be determined for smaller acceleration events.

The vehicle cabin 102 must have some enclosed atmosphere. The system 100 may not function in an automobiles with open windows, since the air may escape fast enough to not create a pressure differential. Vehicles with atmospheric pressure control such as jet airliners may cause enough noise/disturbance in the system that the barometer readings would have to calibrated in a different way.

Determining a device user's position within an automobile is one example of an application for this technology. For example, a cellular phone can automatically turn on hands-free operation mode if it determines that the user is currently driving an automobile. Likewise, knowing that the user is in an automobile is not necessarily enough to turn determine to turn on text-to-speech (TTS) for received text messages, since a passenger may not want a received text message presented out loud. However, a driver of the vehicle is more likely to benefit from automatic use of TTS, such that knowing the position of the user inside the vehicle becomes important.

Examples of other applications include turning off the ability to perform certain activities (e.g., video playback, texting, gaming, etc.) or rearranging applications in a launcher to facilitate access with a minimum of user attention. For example, a user interface (UI) of a driver's device could be modified to reposition a mapping application, a location-based service application, a Bluetooth configuration tool, etc. Similarly, a UI of a passenger's device could be modified to highlight entertainment-related applications such as games, music, video, and instant messaging. Connectivity to a vehicle's wireless communication system (e.g., Bluetooth) could be enabled for a driver but not the passenger.

The same operational principles may be used with other vehicles, in addition to automobiles. For example, in a train car, while it there may be additional complexity in determining whether a device is to the front or the rear of the car, the device 110 may be able to determine whether it is located to the left or the right of the car based on changes in pressure in turns. This location information could be used to update information provided by the device, such as providing a map or information regarding landmarks viewed from the window on that side of the train.

Figure 12:
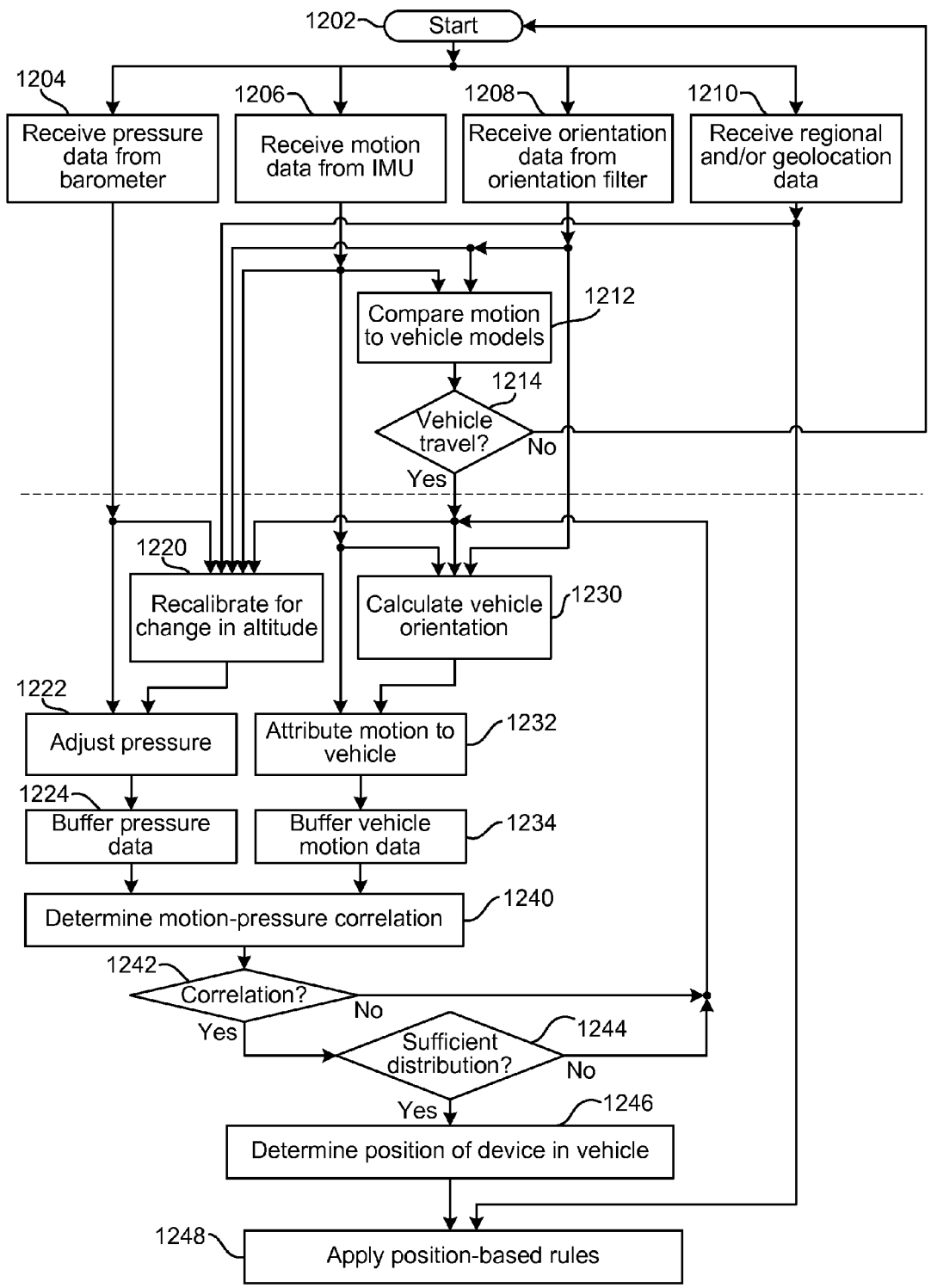
FIG. 12 illustrates a more detailed example of the process that may be used to determine the device user's seating position based on changes in air pressure.

FIG. 12 illustrates a more detailed version of the process illustrated in FIG. 1. From a starting point 1202, the process receives pressure data from a barometer (1204), motion data from the IMU (1206; e.g., accelerometer, gyroscope, and/or magnetometer data), orientation data from an orientation filter (1208) that process IMU data to determine device orientation relative to the Earth reference frame, and regional and/or geolocation data (1210) received via one or more radio receivers (e.g., a GPS receiver, a GLONASS receiver, a TMC receiver, etc.).

Based on the motion data (1206) and the orientation data (1208), the motion data over time is compared (1212) to motion models that characterize motion in various vehicles, such as an automobile and train. If the motion comparison determines that the device is not in a moving vehicle (1214 "No"), the process returns to the starting point (1202). Otherwise (1214 "Yes"), the process beings collecting motion and pressure data to determine the device's position in the vehicle.

The process compares (1220) changes in barometer data with motion data from the IMU, orientation data from the orientation filter, and/or an altitude determined based on regional and/or geolocation data to determine whether a change in pressure experienced by the device is due to a change in altitude. For example, based on the orientation of the device frame relative to the Earth frame, a change in acceleration in the up/down direction (Earth frame) will result in a corresponding change in altitude. Recalibration for altitude may also be performed when the collective data indicates that the device is stationary (with stationary acceleration data consisting of acceleration in the Earth-frame downward direction due to gravity) and the barometer data is stable. Recalibration may also be based on there being a relatively stable before vehicle acceleration (e.g., a turn, forward acceleration, etc.), baselining the ambient pressure based on the pressure immediately prior to the acceleration, if the pressure had been relatively stable (e.g., using the pressure that was recorded a half-second prior to the initiation of acceleration). The recalibrated altitude is used to adjust (1222) the pressure value that will be used to determine device position, and the adjusted pressure is buffered (1224) with a time index so that pressure-over-time may be compared to changes in vehicle motion.

The process also compares motion data from the IMU and orientation data from the orientation filter to calculate (1232) an orientation of the vehicle. This calculation is based on the assumption that the average acceleration of the vehicle over time in the Earth-frame tangent plane 680 will be due to the forward motion of the vehicle in the direction of the longitudinal $Y_{Vehicle}$ direction. Based on forward motion over time, changes in motion may be attributed (1252) to the vehicle, translating motion data from the device frame of reference onto the vehicle frame of reference. In addition, vehicle motion tends to be relatively stable, such that sudden changes in accelerometer, gyroscope and magnetometer data that exceed a threshold value (e.g., data that is inconsistent with a turn that should instead be attributed to device motion within the vehicle cabin, such as if the device is being rotated in a person's hand) may be filtered. The motion data attributed to the vehicle is buffered (1230) with a time index so that it can be compared with changes in pressure over time.

A motion model is then applied to correlate (1240) changes in motion data with changes in pressure data. Among other factors, the amount of time after acceleration begins before the pressure begins to change is directly proportional to the magnitude and duration of the acceleration.

If a change in pressure does not correlate (1242 "No") with a change in motion, the data collection process continues. Otherwise (1242 "Yes"), a determination (1244) is determined as to whether there is a sufficient sample set of correlations to determine the position of the device within the vehicle. For example, there may be a determination as to whether the distribution of negative pressures in one quadrant exceeds the number of negative pressures in the other quadrants by a threshold percentage or number. If there is not a sufficient sample set (1244 "No"), data collection continues. Otherwise (1244 "Yes"), the process determines (1246) the position of the device in the vehicle based on correlated motion and pressure data, as discussed in connection with FIGS. 10, and 11.

Positioned-based rules may then be applied (1248) based on the position of the determined device within the vehicle and the geographic location of the vehicle (e.g., the country). The geographic location of the vehicle may be determined using the received regional and/or geolocation data (1210). Each rule is associated with an action to be taken. For example a rule may specify that if the vehicle is an automobile and the device is co-located with the driver, enable Bluetooth and establish a paired connection with the vehicle. Another rule may specify that if the vehicle is an automobile and the device is co-located with the driver, enable text-to-speech and speech-to-text, but disable typing-based messaging.

Figure 13:
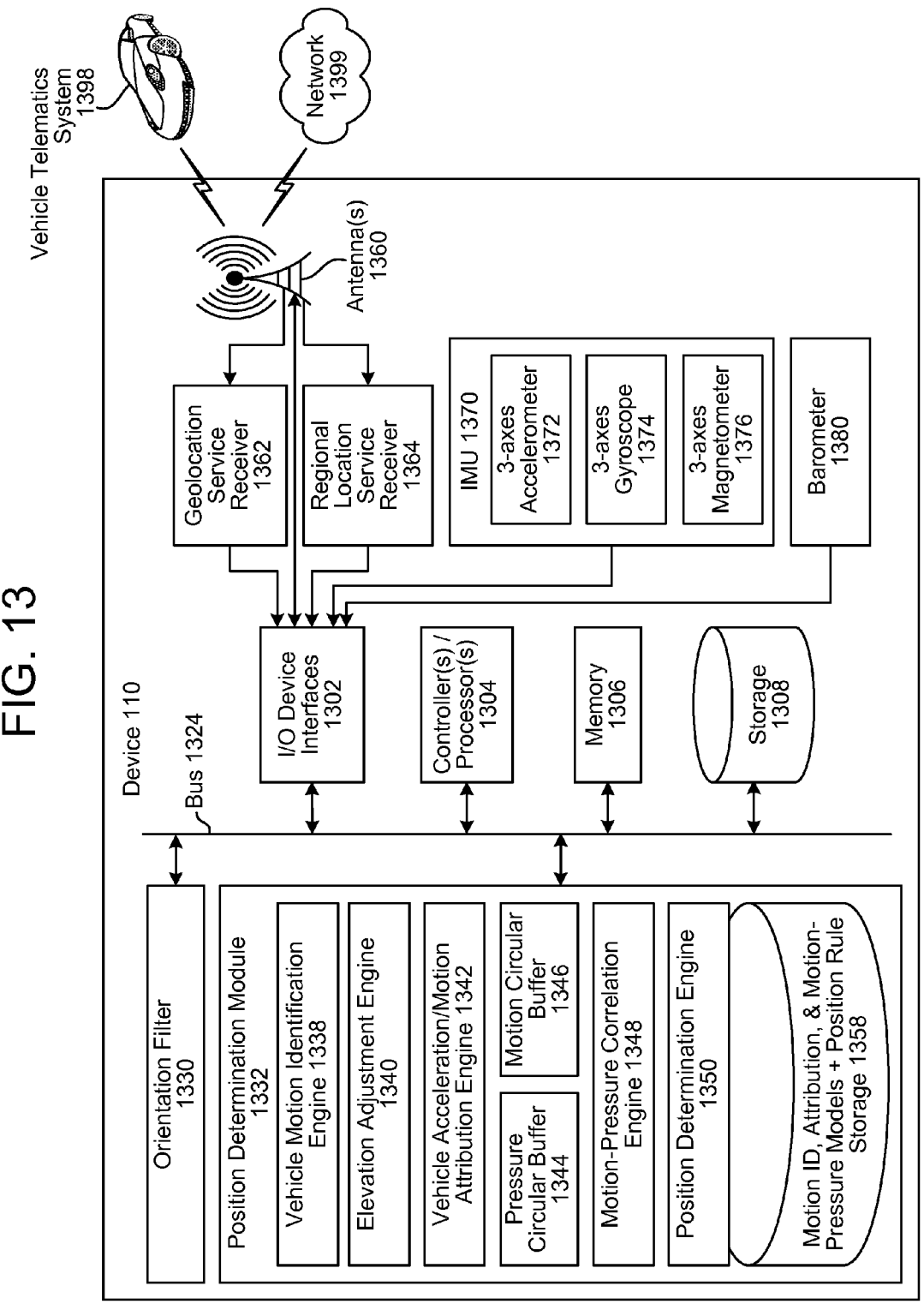
FIG. 13 is a block diagram conceptually illustrating example components of a system for determining the device user's seating position based on changes in air pressure.

FIG. 13 is a block diagram conceptually illustrating example components of the device 110. In operation, the system 100 may include computer-readable and computer-executable instructions that reside on the device 110, as will be discussed further below.

As illustrated in FIG. 13, the device 110 may include several components for data collection. One or more antennas 1360 may support connectivity with the vehicle's telematics system 1398, providing support for features like Bluetooth connectivity. The vehicle's telematics system 1398 may also provide motion information, as many vehicles include an inertial measurement unit (IMU) to manage vehicle operation, such as the vehicle's own barometer data, accelerometer data, braking system data, turning/steering system data, etc. Among other things, data provided by a vehicle telematics system may be used to supplement the device 110 for bootstrapping.

The antennas(s) 1360 may also connect to a geolocation service receiver 1362 and a regional service location receiver 1364 to acquire information about where the device 110 is location. These receivers may be software or hardware based, and are commonly included in devices that support navigation-based services. The antenna(s) 1360 may also be used to connect to a cellular wireless data network 1399 such as a Long Term Evolution (LTE) network, WiMAX network, 3G network, etc.

The device 110 includes an inertial measurement unit (IMU) 1370 and a barometer 1380. The IMU 1370 comprises a 3-axes accelerometer 1372, a 3-axes gyroscope 1374, and a 3-axes magnetometer 1376. A dedicated gravity sensor to determine the "down" direction may also be included to supplement data from the accelerometer 1372.

The device 110 includes input/output device interfaces 1302 that connect the data acquisition and communication components to the rest of the device 110. In addition to the illustrated data acquisition and communication components, a variety of additional components may be connected through the input/output device interfaces 1302, such as a touch-sensitive display, a speaker, a microphone, etc. The input/output device interfaces 1302 may also include an interface for an external peripheral device connection such as universal serial bus (USB), FireWire, Thunderbolt or other connection protocol. The input/output device interfaces 1302 may provide protocol and transceiver support for the various communications links, such as support for Bluetooth, a wireless local area network (WLAN) (such as WiFi) radio, and cellular radio, such as supporting LTE, WiMAX, CDMA, GSM, etc. Through a network 1399, the system 100 may be distributed across a networked environment, as will be discussed further below with FIG. 14.

The device 110 may include an address/data bus 1324 for conveying data among components of the device 110. Each component within the device 110 may also be directly connected to other components in addition to (or instead of) being connected to other components across the bus 1324.

The device 110 may include one or more controllers/processors 1304, that may each include a central processing unit (CPU) for processing data and computer-readable instructions, and a memory 1306 for storing data and instructions. The memory 1306 may include volatile random access memory (RAM), non-volatile read only memory (ROM), non-volatile magnetoresistive (MRAM) and/or other types of memory. The device 110 may also include a data storage component 1308, for storing data and controller/processor-executable instructions (e.g., instructions to perform the processes illustrated in FIGS. 1 and 12). The data storage component 1308 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1302.

Computer instructions for operating the device 110 and its various components may be executed by the controller(s)/processor(s) 1304, using the memory 1306 as temporary "working" storage at runtime. The computer instructions may be stored in a non-transitory manner in non-volatile memory 1306, storage 1308, or an external device. Alternatively, some or all of the executable instructions may be embedded in hardware or firmware in addition to or instead of software.

The device 110 further includes an orientation filter 1330 that determines an orientation of the device 110 relative to the Earth reference frame. The orientation filter may be shared among device services, such as being shared with navigation services and a motion-controlled user-interface (UI) service on the device 110. The orientation filter may be a software or firmware component, or may be implemented in hardware, such as an orientation filter that is integrated together with the IMU 1370. The orientation filter 1330 may be connected directly to the IMU 1370 to reduce latency when sampling the motion sensors. A conventional orientation filter may be used.

A position determination module 1332 determines a position of the device 110 within the vehicle cabin 102 based on motion and air pressure changes. An included storage component 1358 may comprise independent non-volatile storage, and/or storage 1358 may comprise a portion of memory 1306 or storage 1308.

A vehicle motion identification engine 1338 of the position determination module 1332 compares (1212) data from the IMU 1370 and the orientation filter 1330 over time with one or more motion models and/or heuristic rule sets stored in storage 1358 to determine whether motion experienced by the device is consistent with vehicle motion. If a model matches, the motion identification engine 1338 may identify the vehicle type (e.g., motor vehicle, train, etc.). The vehicle motion identification engine 1338 may intermittently sample the fused sensor data to update whether motion is still consistent with vehicle travel.

The magnitude and frequency of "energy" associated with fused motion sensor data while in a vehicle is distinctly different than that produced by a person holding a device, walking with the device, etc. In addition, this magnitude and frequency of energy associated with motion varies by vehicle type (e.g., a train versus a plane versus an automobile). Ordinarily, an energy signature of a vehicle will exhibit continuous, near-constant patterns beyond the occasional abrupt changes in the direction of gravity in the Earth-frame due to bumps, potholes, etc. that exceed the suspension's ability to cope. In comparison, fused motion due to movement of a person's hand in the case of a handheld device will exhibit higher frequency characteristics than the near-constant patterns characteristic of vehicle motion.

The vehicle motion identification engine 1338 may include a Kalman filter configured to perform entropy/energy calculations based on the direction and magnitude of the motion vector and a derived first order amplitude (the changing vector over time) of the fused motion sensor data. A series of samples may be analyzed using heuristics. For example, a large abrupt change in energy is unlikely to be attributable to the vehicle, as opposed to a person shaking the device, leading to abrupt changes in amplitude and direction.

As an alternative to or in conjunction with the Kalman filter based approach, the vehicle motion identification engine 1338 may include, among other things, a classifier that compares motion data with motion signature models stored in storage 1358 to classify sampled motion data as "vehicle" or "not vehicle." If the resulting classification value or values are consistently above a threshold energy, a determination is made that the device is travelling in a vehicle, and if consistently below a threshold energy, that the device is not travelling in a vehicle. The classifier may also be used to determine a vehicle "type," with different signature models being associated with different types of vehicles.

For example, for each signature model that the data is compared with, the classifier may output a score between zero and one. A score of zero corresponds to no correlation with the vehicle motion model, whereas a score of one corresponds to complete correlation with the vehicle motion model. The vehicle motion identification engine 1338 compares a threshold (e.g., 0.8) to each classifier score, and if the motion data sampled over time and compared to a signature consistently produces scores that exceed the threshold over a specified minimum duration, a determination is made that the device is travelling in a vehicle. The vehicle signature consistently (e.g., based on a standard or mean deviation) producing the highest scores may be used to determine a vehicle type. Likewise, if the classifier scores continue to score below the threshold at a specified rate over a specified duration, a determination is made that the device is not travelling in a vehicle. If neither "state" is determined to be true, then the device will continue to sample the data until a determination can be made one way or the other (an "indeterminate" third state).

An elevation adjustment engine 1340 of the position determination module 1332 processes motion data from the IMU 1370, the barometer 1380, the orientation filter 1330, the geolocation service receiver 1362, and/or the regional location service receiver 1364 (and if available, from the vehicle's telematics system 1398) to determine (1220) whether a change in pressure is due to a change in altitude, and adjusts (1222) the measured pressure accordingly so that the motion-pressure correlations (e.g., FIGS. 10, 11) are not skewed due by changes in pressure to changes in altitude.

A vehicle motion attribution filter 1342 processes motion data from the IMU 1370 and/or orientation data from the orientation filter 1330 to calculate (1230) an orientation of the vehicle axes relative to the device 110 (or vice-versa), and translates (1232) the motion data from the device frame of reference to the vehicle frame of reference. The vehicle motion attribution filter 1342 may include, among other things, a classifier that applies motion models stored in storage 1358 to determine if a particular change in motion is consistent with a change in vehicle motion, and adjust the attribution of the motion data to the vehicle or the device accordingly. The models used by the motion attribution filter 1342 may be, for example, statistical-based models that are compared with rates of change in fused accelerometer, gyroscope, and/or magnetometer data.

The vehicle motion attribution filter 1342 may use the same classifier may be used by both the vehicle motion identification engine 1338. Whereas the vehicle motion identification engine 1338 applies a threshold to the classifier output to determine "vehicle" or "not vehicle," the vehicle acceleration/motion attribution engine 1342 uses the classifier score to determine how motion experienced by the device in the device sensor frame of reference should be attributed to the vehicle and translated into the vehicle frame of reference.

For example, the vehicle motion attribution filter 1342 may multiply the data from the IMU by the classifier score), with the revised values being that part of the motion attributed to the vehicle. The vehicle motion attribution filter 1342 translates the revised values from the device/sensor frame into the vehicle frame of reference. Translation from one frame of reference to another is an operation commonly performed by orientation filters, and such techniques may be used here. See, for example, "An efficient orientation filter for inertial and inertial/magnetic sensor arrays" by Sebastian O. H. Madgwick, Report x-io and University of Bristol (UK), 2010.

Using data such as steering system and accelerometer data from a vehicle's telematics system 1398, the position determination module 1332 may iteratively refine and improve the vehicle motion models utilized by the classifier to minimize differences between the motion attribution as determined using the models and empirical results. For example if the vehicle telematics system 1398 reports the vehicle's actual motion, when there is a difference between what the vehicle reports and what the vehicle motion attribution filter 1342 calculates using the classifier score that exceeds a threshold limit, the model can refined by placing the classifier in a training mode and providing it both the sensor data input that produced the incorrect result and the vehicle data as the desired result. By this method, the classifier can adaptively retrain itself, using this bootstrapping technique for supplemental unsupervised learning.

The altitude-adjusted pressure may be stored in a pressure buffer 1344, and the motion attributed to vehicle motion may be stored in a motion buffer 1346. These buffers may be, among other things, circular buffers that continually overwrite old data, and may comprise dedicated memory/storage or a portion of memory 1306 or storage 1308. These buffers serve several purposes. First, since a change in pressure will typically lag a change in vehicle acceleration, buffering allows looking at the motion that occurred leading up to a change in pressure. Second, buffering simplifies determining magnitude of the accelerometer vector (e.g., 921 to 924 in FIG. 9A) and the magnitude of the change in pressure (e.g., 931 to 934 in FIG. 9B), as multiple motion data readings and multiple pressure data readings may be used to determine a single correlated data point. Third, if motion-pressure correlation is not performed on the device, but is instead performed on a remote network-connected device, the motion and pressure data may be accumulated and sent in batches to reduce network traffic. In regard to a distributed network arrangement, alternatives include instead buffering IMU, orientation filter, and barometer data with a time index, and locating some or all of the other components of position determination module 1332 to the remote network-connected device.

The motion-pressure correlation engine 1348 of the position determination module 1332 monitors the changes in pressure and vehicle motion and determines (1240, 1242) whether a correlation exists. The motion-pressure correlation engine 134 may perform a coarse analysis of the rates of change in pressure and motion data over a time period spanning several seconds up to several minutes.

For example, the rate of change of acceleration may be derived over time, and compared to a delayed rate of change in pressure to determine. The rate of change of acceleration and the rate of change of acceleration may be determined based on multiple stored samples of each, thereby mitigating the influence on sensor noise (e.g., the localized swings in pressure exhibited in FIGS. 7 and 8). For example, three samples may be used to determine a rate of change: a current sample, a preceding sample, and the following sample.

Since the delay between the change in pressure following a change in acceleration depends in part on the magnitude of the rate of change in acceleration and the size and dimensions of the vehicle cabin, this delay can vary. A suitable method for determining a correlation in such a circumstance is use of "random forests," which is a machine learning technique commonly used for data mining.

Random forests are an ensemble learning method used for regression analysis to estimate relationships among variable inputs, and classification of sets of input data based on training sets of data containing examples that do and do not correlate. The training sets are used to construct a multitude of "decision trees" at training time. The random forests are trained and stored using acceleration rate and pressure rate data of with varying offset delays (e.g., the delay after the change in acceleration before the change in pressure occurs) and of varying magnitudes. These decision trees are stored on the device 110 in storage 1358. Different sets of decision trees may be used for different vehicle types, with the set used depending upon the vehicle type determined by the vehicle motion identification engine 1338 (e.g., different sets for automobiles, trains, planes, etc., depending on the level of specificity used for vehicle identification)

A correlation between a pressure rate change and an acceleration rate change may be determined by comparing data using moving time windows, sifting the buffered motion and pressure data to find data that matches one of the stored models. The length of the time windows may be set dynamically to sample changes in the pressure data that start after and overlap in time with the change of rate of the motion data. For example, if the rate of change of acceleration is positive for "N" seconds, then the time window of the rate of change of pressure data that is examined may be from the start of the rate of change of acceleration, forward in time for "N" second plus an offset delay time limit.

Based on time stamps of where a correlation is found, a local pressure minima or maxima relative to the baseline pressure or reference pressure following a change in acceleration may be extracted from the pressure buffer, where the minima or maxima is the extreme of the pressure change following the change in the rate of acceleration. The local peak acceleration preceding the pressure minima/maxima is then identified from the store motion data, with the identified peak acceleration and the associated pressure maxima/minima stored as a data point to be used to determine the position of the device in the vehicle (e.g., as one of the "p" points illustrated in FIGS. 9B, 9C, 10, and 11).

The position determination engine 1350 of the position determination module 1332 determines if there is sufficient correlated data (1244) (i.e., stored points "p") to determine a position of the device in the vehicle, and determines (1246) that position when there is. The position determination engine 1350 utilizes an algorithm to make the quadrant determination, such as a decision tree (e.g., testing the data in each quadrant using if-then statements to determine if one is lower based on a Gaussian model, averaging, etc., than the others by a threshold amount, or that no quadrant is lower than the other by the threshold amount and that more data is needed), a purely mathematical decision (e.g., the direction of the acceleration vector corresponding to the lowest pressure), or cluster-based analysis (as illustrated in FIGS. 10 and 11).

After a position is determined, the position determination engine 1350 may determine whether the position matches one or more rules stored in storage 1358, and cause an action associated with a rule to be applied (1248). The rules may be based on device position in the vehicle (e.g., quadrant), geographic location (e.g., based on data from the geolocation service receiver 1362 and/or regional location service receiver 1364), the identified type of vehicle travel (from motion identification engine 1338), the time of day (e.g., nighttime versus daylight), etc.

As noted above, at least some of the components of the position determination module 1332 may be distributed among devices over the network 1399 to reduce the computational burden on the device 110. Arranged in a distributed environment, components of the position determination module 1332 may receive motion and/or air pressure over a wireless communication channel via antenna(s) 1360. While the orientation filter 1330 may also be remote located, the accuracy of the orientation filter 1330 will be reduced if sampling data from the gyroscope 1374 is missed, as the accuracy of the orientation filter 1330 improves with frequent sampling of gyroscope data.

The components of the device 110 as illustrated in FIG. 13 are exemplary, and may be a stand-alone device or may be included, in whole or in part, as a component of a larger device or system.

The concepts disclosed herein may be applied within a number of different devices and computer systems, including, for example, cellular telephones, personal digital assistants (PDAs), tablet computers, and wearable computing devices (e.g., "smart" watches), other mobile devices, etc.

Figure 14:
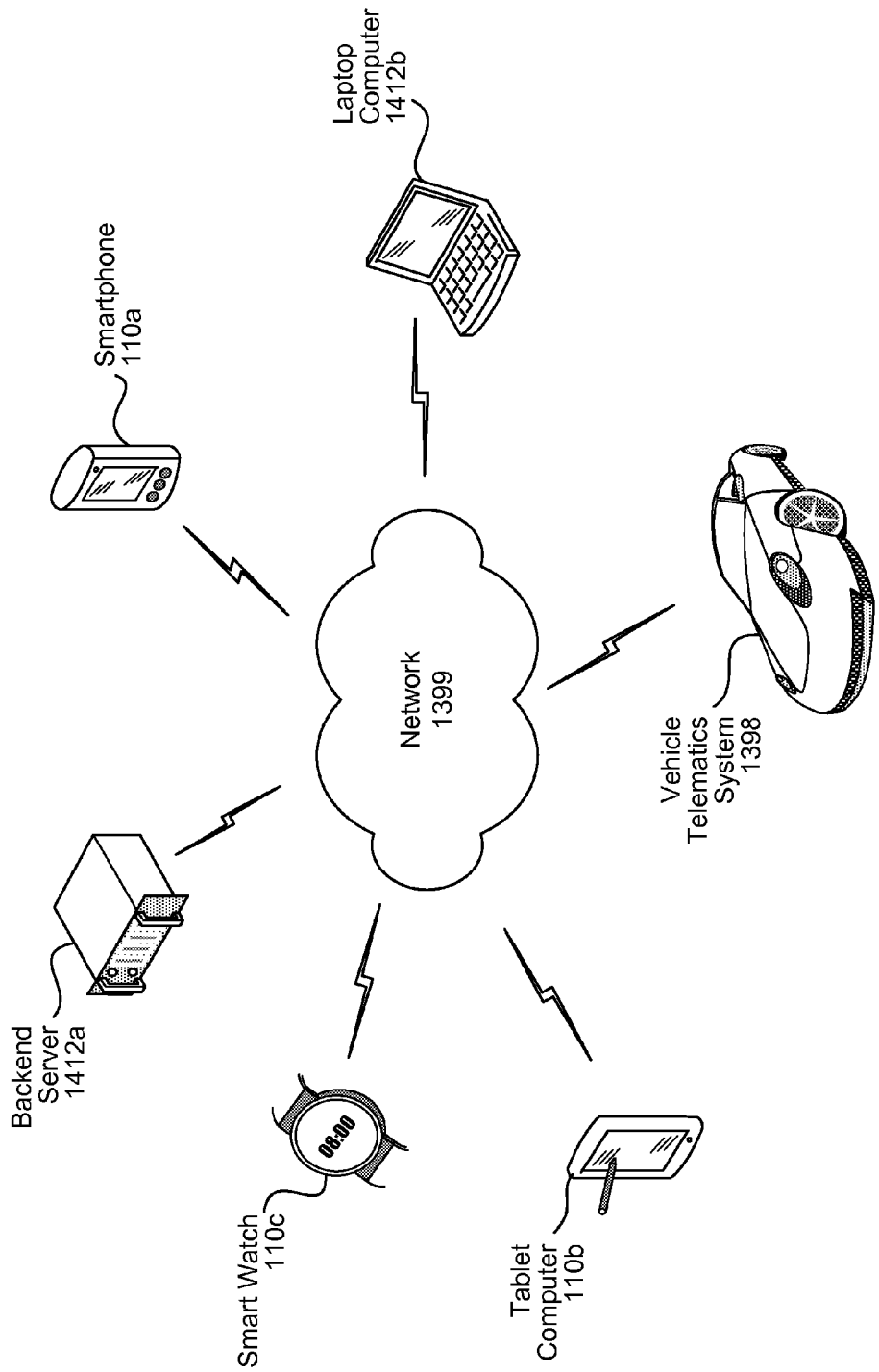
FIG. 14 illustrates the device arranged in a distributed network environment.

As illustrated in FIG. 14, multiple devices may contain components of the system 100 and the devices may be connected over a network 1399. Examples of devices 110 include a "smart" phone 110a, a tablet computer 110b, and a smart watch 110c. Portions of the position determination module 1338 may be distributed across the network, such as being located on a backend server 1412a or laptop computer 1412b. The distributed portions of the position determination module 1338 may also communicate with the vehicle's own telematics system 1398, such as acquiring motion data directly from the vehicle (in addition to motion data from the device 110). By dividing data acquisition and data processing between connected devices, the computational load on the data acquisition device can be reduced. This may be advantageous when the data acquisition device (e.g., device 110) has limited processing power.

Whether resident on the device 110 or on a component distributed elsewhere on the network, if the motion-pressure correlation engine 1348 is unable to determine a correlation with pressure changes using the preloaded "bootstrap" models, or repeated position determinations by the position determination engine 1350 does not produce consistent results (e.g., results that are not the same at least 97% of the time), data from the pressure circular buffer 1344 and motion circular buffer 1346 may be uploaded (e.g., via network 1399) to a backend server 1412a. The backend server 1412a may collect data in this manner over several days or weeks, and use the data as training data for a random forest, continuing to collect information until the resulting decision trees produce consistent results (e.g., 97% consistency). The new decision trees may then be uploaded to the device 110, supplementing and/or replacing the preloaded bootstrap models.

The above examples are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, navigation systems, and motion based user interfaces should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more of the orientation filter 1330 and the engines of the position determination module 1330 may be implemented as firmware or as a state machine in hardware. For example, the orientation filter 1330 may be implanted on an application specific integrated circuit (ASIC) together with the IMU 1370. As another example, if the position determination engine 1350 is implemented as a decision tree, it may be implemented as a field programmable gate array (FPGA).

As used in this disclosure, the term "a" or "one" may include one or more items unless specifically stated otherwise. Further, the phrase "based on" is intended to mean "based at least in part on" unless specifically stated otherwise.

What is claimed is:

1. A method of determining a position of an electronic device located within a moving vehicle, the method comprising:
    determining that the electronic device is located in a cabin of the vehicle based on first motion data provided by motion sensors of the electronic device;
    determining an average direction of motion of the electronic device using the first motion data;
    determine an average direction of motion of the electronic device over time;
    dividing an area representing the cabin into a front-right quadrant, a front-left quadrant, a back-right quadrant, and a back-left quadrant, based on the average direction of motion of the electronic device;
    receiving second motion data from the motion sensors;
    determining, using the second motion data, that the vehicle is accelerating;
    determining a rate of change of acceleration for the vehicle;
    receiving, from a barometer of the electronic device, first air pressure data within the vehicle;
    determining a rate of change of the air pressure within the vehicle based on the first air pressure data for a first time period, wherein the first time period starts after the vehicle starts accelerating and overlaps in time with a second time period during which the vehicle is accelerating;
    comparing the rate of change of the air pressure to the rate of change of the acceleration to determine that a reduction in air pressure within the vehicle at a beginning of the first time period was caused by the acceleration;
    determining that the device is located in the front-right quadrant based on a direction of the acceleration that caused the reduction in the air pressure being in a direction of the front-right quadrant; and
    changing a configuration of the electronic device.

2. The method of claim 1, further comprising:
    receiving third motion data from the motion sensors;
    determining that the vehicle is stationary based on the third motion data;
    receiving second air pressure data from the barometer, the second air pressure data corresponding to the vehicle being stationary; and
    determining a reference pressure value for the vehicle from the second air pressure data,
    wherein the reduction in air pressure is relative to the reference pressure.

3. A computing device comprising:
    a processor;
    a motion sensor;
    a barometer;
    a memory including instruction operable to be executed by the processor to configure the processor to:
        determine a first change in acceleration of the computing device based on first motion data from the motion sensor, wherein the computing device is located in a vehicle;
        determine, using the barometer, a first pressure value corresponding to air pressure within the vehicle;
        compare the first pressure value to a reference pressure value for the vehicle to determine a first change in air pressure;
        determine a first correlation between the first change in acceleration and the first change in air pressure following the first change in acceleration;
        determine a position of the computing device in the vehicle based on the first correlation; and
        execute an action based on the position of the computing device in the vehicle.

4. The computing device of claim 3, wherein the first pressure value is lower than the reference pressure value following the first change in acceleration.

5. The computing device of claim 4, wherein the instructions further configure the processor to:
    determine that the vehicle is stationary based on second motion data from the motion sensor; and
    determine, using the barometer, the reference pressure value for the vehicle.

6. The computing device of claim 3, wherein the first change in acceleration is in a first direction, and the instructions further configure the processor to:
    determine a second change in acceleration of the computing device based on second motion data from the motion sensor, wherein the computing device is located in the vehicle, the second change in acceleration is in a second direction, and the second direction is different than the first direction;
    determine, using the barometer, a second pressure value corresponding to air pressure within the vehicle;
    compare the first pressure value to the reference pressure value for the vehicle to determine a second change in air pressure;
    determine a second correlation between the second change in acceleration and the second change in air pressure following the second change in acceleration;
    determine that the computing device is toward a front or a back of the vehicle based on the first correlation; and
    determine that the computing device is toward a right side or a left side of the vehicle based on the second correlation,
    wherein the position of the computing device in the vehicle is determined further based on the second correlation.

7. The computing device of claim 3, further comprising a radio receiver, wherein the instructions further configure the processor to:
    determine a geographic location of the computing device based on data received by the radio receiver,
    wherein the action is further based on the geographic location.

8. The computing device of claim 3, wherein the instructions further configure the processor to:
    compare second motion data from the motion sensor with a plurality of motion signatures, each motion signature being associated with a different type of vehicle; and
    determine a type of the vehicle based on the second motion data matching a motion signature of the plurality of motion signatures,
    wherein the action is further based on the type of the vehicle.

9. The computing device of claim 3, wherein the motion sensor comprises an accelerometer, a gyroscope, or a magnetometer.

10. The computing device of claim 3, wherein the instructions further configure the processor to:
    determine an average direction of motion over time based on second motion data from the motion sensor; and
    divide an area representing a cabin of the vehicle into a front-right quadrant, a front-left quadrant, a back-right quadrant, and a back-left quadrant, based on the average direction of motion of the computing device,
    wherein the position of the computing device is determined to be in one of the quadrants.

11. The computing device of claim 10, wherein the instructions to divide the area representing the cabin further configure the processor to:
    determine a direction of a longitudinal axis of the vehicle based on the average direction of motion of the computing device, the longitudinal axis dividing quadrants of the cabin left-and-right, and a lateral axis perpendicular to the longitudinal axis dividing quadrants of the cabin front-and-back.

12. A non-transitory computer-readable storage medium storing processor-executable instructions for controlling a computing device, comprising program code to configure the computing device to:
    determine a first change in acceleration based on first motion data from a motion sensor, wherein the motion sensor is located in a vehicle;
    determine, using a barometer located in the vehicle, a first pressure value corresponding to air pressure within the vehicle;
    compare the first pressure value to a reference pressure value for the vehicle to determine a first change in air pressure;
    determine a first correlation between the first change in acceleration and the first change in air pressure following the first change in acceleration;
    determine a position of the barometer in the vehicle based on the first correlation; and
    execute an action based on the position of the barometer in the vehicle.

13. The non-transitory computer-readable storage medium of claim 12, wherein the first pressure value is lower than the reference pressure value following the first change in acceleration.

14. The non-transitory computer-readable storage medium of claim 13, wherein the program code further configures the computing device to:
    determine that the vehicle is stationary based on second motion data from the motion sensor; and
    determine, using the barometer, the reference pressure value for the vehicle.

15. The non-transitory computer-readable storage medium of claim 12, wherein the first change in acceleration is in a first direction, and the program code further configures the computing device to:
    determine a second change in acceleration based on second motion data from the motion sensor, wherein the motion sensor is located in the vehicle, the second change in acceleration is in a second direction, and the second direction is different than the first direction;
    determine, using the barometer, a second pressure value corresponding to air pressure within the vehicle;
    compare the first pressure value to the reference pressure value for the vehicle to determine a second change in air pressure;
    determine a second correlation between the second change in acceleration and the second change in air pressure following the second change in acceleration;
    determine that the barometer is toward a front or a back of the vehicle based on the first correlation; and
    determine that the barometer is toward a right side or a left side of the vehicle based on the second correlation,
    wherein the position of the barometer in the vehicle is determined further based on the second correlation.

16. The non-transitory computer-readable storage medium of claim 12, wherein the program code further configures the computing device to:
    determine a geographic location of the vehicle,
    wherein the action is further based on the geographic location.

17. The non-transitory computer-readable storage medium of claim 12, wherein the program code further configures the computing device to:
    compare second motion data from the motion sensor with a plurality of motion signatures, each motion signature being associated with a different type of vehicle; and
    determine a type of the vehicle based on the second motion data matching a motion signature of the plurality of motion signatures,
    wherein the action is further based on the type of the vehicle.

18. The non-transitory computer-readable storage medium of claim 12, wherein the program code further configures the computing device to:
    determine an average direction of motion over time based on second motion data from the motion sensor; and
    divide an area representing a cabin of the vehicle into a front-right quadrant, a front-left quadrant, a back-right quadrant, and a back-left quadrant, based on the average direction of motion,
    wherein the position of the barometer is determined to be in one of the quadrants.

19. The non-transitory computer-readable storage medium of claim 18, wherein the program code to divide the area representing the cabin further configures the computing device to:
    determine a direction of a longitudinal axis of the vehicle based on the average direction of motion of the computing device, the longitudinal axis dividing quadrants of the cabin left-and-right, and a lateral axis perpendicular to the longitudinal axis dividing quadrants of the cabin front-and-back.

20. The non-transitory computer-readable storage medium of claim 12, wherein the program code further configures the computing device to:
    receive at least one of the first motion data and the first pressure data via a wireless communication channel.

\* \* \* \* \*